United States Patent
Crawley et al.

(10) Patent No.: US 11,017,613 B2
(45) Date of Patent: May 25, 2021

(54) AUGMENTED REALITY ENABLED CONTROL SYSTEM AND METHOD FOR ACTIVE ASSET CONTROL WITH REAL-TIME ATTRIBUTE TRACKING

(71) Applicants: Michael M. Crawley, San Clemente, CA (US); Gary Demel, San Clemente, CA (US)

(72) Inventors: Michael M. Crawley, San Clemente, CA (US); Gary Demel, San Clemente, CA (US)

(*) Notice: Subject to any disclaimer, the term of this patent is extended or adjusted under 35 U.S.C. 154(b) by 79 days.

(21) Appl. No.: 15/919,776

(22) Filed: Mar. 13, 2018

(65) Prior Publication Data

US 2019/0287316 A1  Sep. 19, 2019

(51) Int. Cl.
*G07C 5/00* (2006.01)
*G06T 19/00* (2011.01)

(52) U.S. Cl.
CPC ............ *G07C 5/006* (2013.01); *G06T 19/006* (2013.01)

(58) Field of Classification Search
CPC .............................. G07C 5/006; G06T 19/006
See application file for complete search history.

(56) References Cited

U.S. PATENT DOCUMENTS

| | | | | |
|---|---|---|---|---|
| 5,758,300 A | * | 5/1998 | Abe | G01M 15/05 455/424 |
| 6,084,870 A | * | 7/2000 | Wooten | G08G 1/127 340/425.5 |
| 6,112,152 A | | 8/2000 | Tuttle | |
| 6,330,499 B1 | * | 12/2001 | Chou | G07C 5/008 701/31.4 |
| 6,681,990 B2 | | 1/2004 | Vogler et al. | |
| 6,745,151 B2 | * | 6/2004 | Marko | G07C 5/008 701/31.4 |
| 7,084,769 B2 | | 8/2006 | Bauer et al. | |
| 7,453,356 B2 | | 11/2008 | Bedenko | |
| 7,623,949 B2 | * | 11/2009 | Nou | G07C 5/008 340/539.13 |
| 7,681,921 B2 | | 3/2010 | Mercer et al. | |
| 7,945,359 B2 | * | 5/2011 | Watkins | G07C 5/0841 340/457 |
| 8,209,076 B2 | | 6/2012 | Boss et al. | |
| 8,521,613 B2 | | 8/2013 | Erbey et al. | |
| 8,924,071 B2 | * | 12/2014 | Stanek | G07C 5/0816 701/31.4 |
| 8,954,225 B2 | | 2/2015 | Laforge et al. | |
| 9,147,175 B2 | | 9/2015 | Schmidt et al. | |

(Continued)

*Primary Examiner* — Ramsey Refai
(74) *Attorney, Agent, or Firm* — Olav M. Underdal; IDP Patent Services

(57) ABSTRACT

A system for active asset control includes: assets, which can be vehicles; asset beacons positioned in the assets; an active asset control server with an asset configuration database and an asset status database; and an active asset control device, including a processor, a non-transitory memory, an input/output component, an asset viewer, an asset controller, a location sensor, an orientation sensor, and a data bus; such that a user can view attributes in an augmented reality view, showing completion status and incurred cost for selected services, and control commands of the assets. Also disclosed is a method for active asset control, including positioning asset beacon, retrieving attribute, selecting service, updating service cost, and viewing asset status.

19 Claims, 9 Drawing Sheets

(56) References Cited

U.S. PATENT DOCUMENTS

| | | |
|---|---|---|
| 9,552,569 B1 | 1/2017 | Quan et al. |
| 9,649,999 B1 * | 5/2017 | Amireddy ............... H04W 4/14 |
| 2008/0021605 A1 * | 1/2008 | Huber .................... G06Q 10/00 |
| | | 701/31.4 |
| 2008/0231446 A1 | 9/2008 | Cresto |
| 2010/0022221 A1 | 1/2010 | Yi et al. |
| 2010/0217478 A1 * | 8/2010 | Zhang .................... G07C 5/006 |
| | | 701/31.4 |
| 2011/0227709 A1 | 9/2011 | Story |
| 2011/0295724 A1 | 12/2011 | Hill |
| 2013/0151064 A1 * | 6/2013 | Becker ................... G07C 5/008 |
| | | 701/31.4 |
| 2013/0304278 A1 * | 11/2013 | Chen ....................... G06F 17/00 |
| | | 701/2 |
| 2014/0306826 A1 * | 10/2014 | Ricci ................... B60W 50/085 |
| | | 340/573.1 |
| 2014/0344014 A1 | 11/2014 | MacInnis |
| 2015/0187146 A1 * | 7/2015 | Chen ....................... G07C 5/008 |
| | | 701/31.5 |
| 2016/0350861 A1 | 12/2016 | Loughlin-McHugh et al. |
| 2017/0228688 A1 | 8/2017 | Bourlon |

\* cited by examiner

Asset Beacon

500a

500b

500c

500g

500h

500i

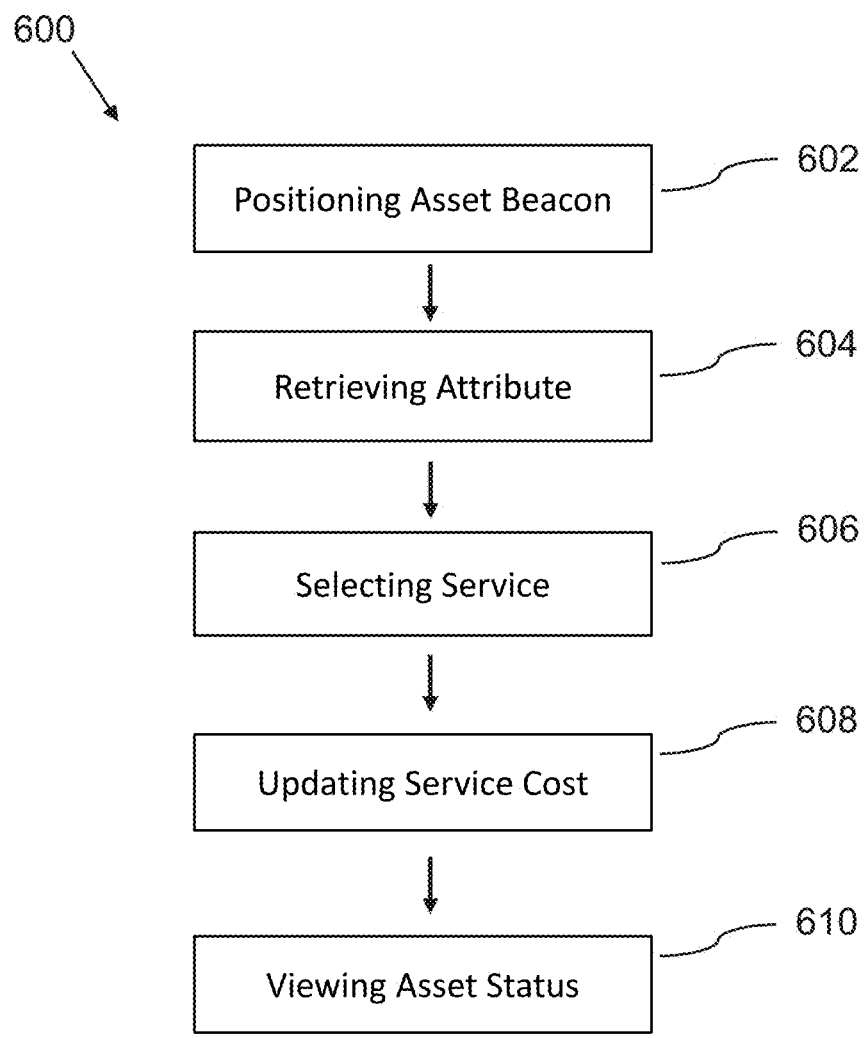

AUGMENTED REALITY ENABLED CONTROL SYSTEM AND METHOD FOR ACTIVE ASSET CONTROL WITH REAL-TIME ATTRIBUTE TRACKING

CROSS-REFERENCE TO RELATED APPLICATIONS

N/A.

FIELD OF THE INVENTION

The present invention relates generally to the field of asset management and control, and more particularly to methods and systems for employing augmented reality and asset tracking for active asset management and control with real-time attribute tracking.

BACKGROUND OF THE INVENTION

Vehicle dealerships and other professional organizations managing a portfolio of assets for sale, have become accustomed to using various management systems, such as dealership management system and enterprise resource planning systems, to manage the operations of their organization.

However, such systems are not well adapted to track the cost of services applied to assets during pre-sale preparation, and sales organizations are as a result frequently not able to calculate expected profit accurately, or manage cost proactively during the sales process.

As such, considering the foregoing, it may be appreciated that there continues to be a need for novel and improved devices and methods for active asset management and control with real-time attribute tracking.

SUMMARY OF THE INVENTION

The foregoing needs are met, to at least a great extent, by the present invention, wherein in aspects of this invention, enhancements are provided to the existing model of active asset management.

In an aspect, a system for active asset control can include:
a) An asset, which can be a vehicle, which can be a part of a plurality of assets;
b) An asset beacon, which is positioned in or on the asset;
c) An active asset control server; and
d) An active asset control device, wherein the active asset control device is connected to the active asset control server and to the asset beacon;
wherein the asset beacon can communicate with the asset in order to receive attributes describing a property of the asset, and to control functions of the asset;
wherein the active asset control device communicates with the asset beacon in order to receive the attributes or to communicate commands to control functions of the asset;
such that a user can view the attributes, and control the commands, via interaction with a graphical user interface of the active asset control device;
wherein the active asset control device can communicate with the active asset control server in order to:
receive configuration information for the asset class (such as make/model/year, SKU, etc.) of the asset, including available attributes and available commands; and
store the attributes that were received from the asset beacon.

In a related aspect, the system for active asset control can further include a vendor procurement system, wherein the asset controller of the active asset control device can be configured to allow a user to browse available services for the asset and select selected services among the available services, in communication via the active asset control server, such that the active asset control server receives and stores status information for the selected services, including completion status and cost incurred for each selected service.

In another related aspect, the active asset control device can incorporate asset information onto an image stream from a camera of the active asset control device, such that the asset viewer uses the location of the active asset control device captured by a location sensor, along with the direction vector of the active asset control device captured by an orientation sensor, and locations of the assets captured by location sensors of asset beacons to calculate positions of assets in the image stream, in order to incorporate the asset information onto the image stream adjacent to the positions of the assets.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. In addition, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 6 is a flowchart illustrating steps that may be followed, in accordance with one embodiment of a method or process of active asset control.

DETAILED DESCRIPTION

Figure 1:
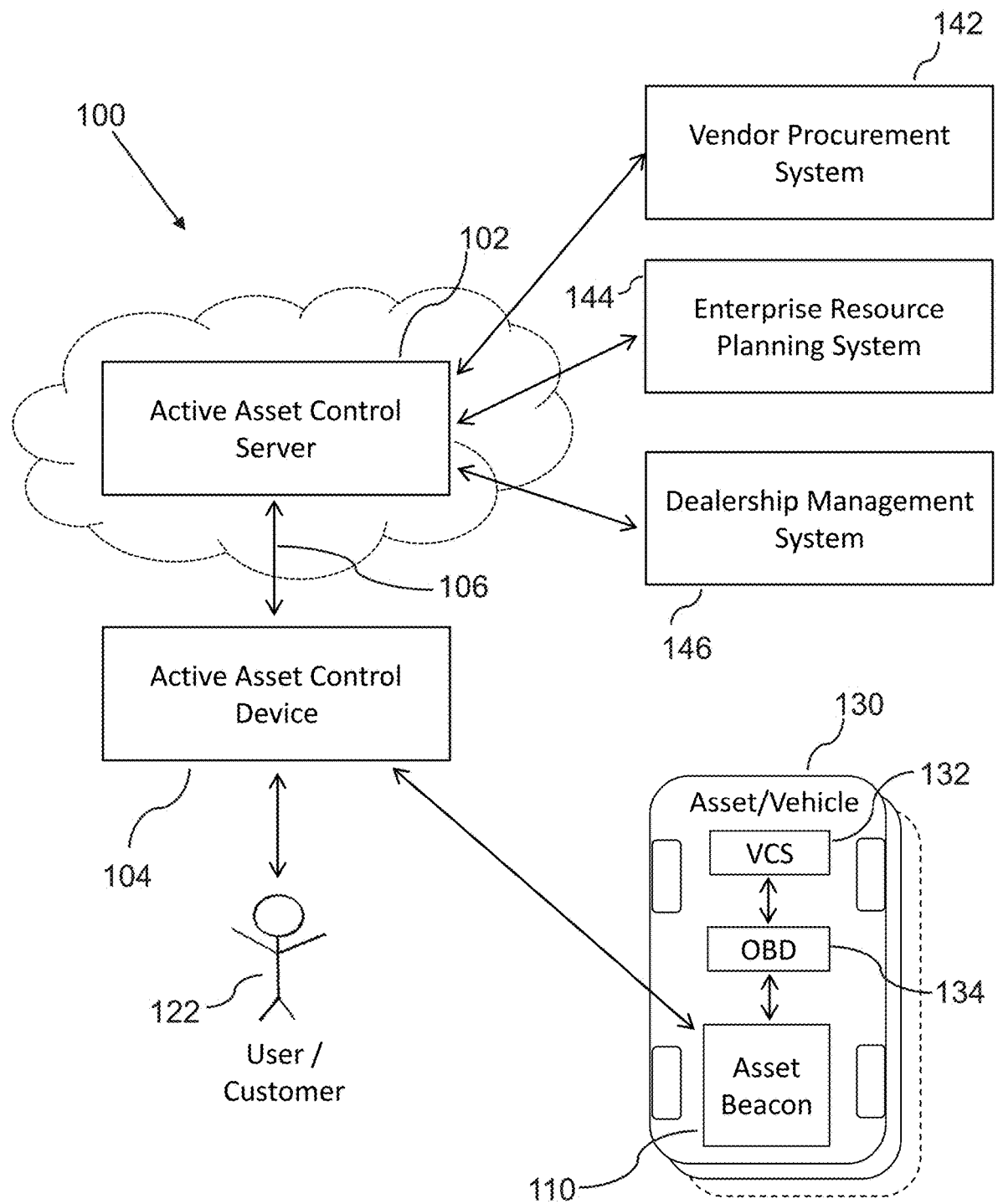
FIG. 1 is a schematic diagram illustrating a system for active asset control, according to an embodiment of the invention.

Before describing the invention in detail, it should be observed that the present invention resides primarily in a novel and non-obvious combination of elements and process steps. So as not to obscure the disclosure with details that will readily be apparent to those skilled in the art, certain conventional elements and steps have been presented with lesser detail, while the drawings and specification describe in greater detail other elements and steps pertinent to understanding the invention.

The following embodiments are not intended to define limits as to the structure or method of the invention, but only to provide exemplary constructions. The embodiments are permissive rather than mandatory and illustrative rather than exhaustive.

In the following, we describe the structure of an embodiment of a system for active asset control 100 with reference to FIG. 1, in such manner that like reference numerals refer to like components throughout; a convention that we shall employ for the remainder of this specification.

In an embodiment, a system for active asset control 100 can include:
a) An asset 130, which can be a vehicle 130, which can be a part of a plurality of assets 130;
b) An asset beacon 110, which is positioned in or on the asset 130;
c) An active asset control server 102; and
d) An active asset control device 104, or a plurality of access control devices 104, wherein the active asset control device 104 is connected to the active asset control server 102 and to the asset beacon 110;
wherein the asset beacon 110 can communicate with the asset 130 in order to receive attributes describing a property of the asset, and to control functions of the asset 130;
wherein the active asset control device 104 communicates with the asset beacon 110 in order to receive the attributes or to communicate commands to control functions of the asset 130;
such that a user can view the attributes, and control the commands, via interaction with a graphical user interface of the active asset control device 104;
wherein the active asset control device 104 can communicate with the active asset control server 102 in order to:
receive configuration information for the asset class (such as make/model/year, SKU, etc.) of the asset 130, including available attributes and available commands; and
store the attributes that were received from the asset beacon 110.

In a related embodiment, an active asset control server 102 can include:
a) A processor 202;
b) A non-transitory memory 204;
c) An input/output component 206;
d) An asset configuration database 212, which can store a plurality of asset class configurations, each including available attributes and available commands for an asset class of assets, such that an asset class can for example be a make/model/year of an asset 130 that is a vehicle 130, and the attributes can for example be gas tank level, battery load percentage, fault code status, etc.; and the available commands can for example be unlock doors, lock doors, start engine, get rpm, get active fault codes, get historical fault codes, etc.; and
e) An asset status database 214, which can store measurements of attributes received from an asset; all connected via
f) A data bus 220.

In a related embodiment, an active asset control device 104 can include:
a) A processor 302;
b) A non-transitory memory 304;
c) An input/output component 306;
d) An asset viewer 310, which can allow a user 122 to view attributes received from an asset 130, and select commands to be sent to the asset; and
e) An asset controller 312, which can communicate with the asset beacon 110 in order to receive the attributes or to communicate commands to control functions of the asset 130;
f) A location sensor 314, which can be configured to calculate a location of the active asset control device 104, for example via use of GPS, wireless or radio triangulation, or combinations of these. The location sensor can for example call services in GOOGLE™ Location Services or IPHONE™ Location Services, or other location API's available in an operation system of the active asset control device 104; and
g) An orientation sensor 316, which can be configured to calculate an orientation or direction vector of the active asset control device 104, for example via use of an inbuilt accelerometer or xyz sensor, or combinations of these. The orientation sensor 316 can for example call services in GOOGLE™ ARKIT™ to calculate the direction vector, or other orientation and virtual reality API's available in an operation system of the active asset control device 104; all connected via
h) A data bus 320.

In a related embodiment, an asset beacon 110 can include:
a) A processor 402;

b) A non-transitory memory 404;
c) An input/output 406;
d) A communication manager 410, which can be configured to process communications with the asset 130; and
e) A location sensor 412, which can be configured to calculate a location of the asset beacon 110, for example via use of GPS, wireless or radio triangulation, or combinations of these; all connected via
f) A data bus 420.

In a further related embodiment, the asset 130 can be a vehicle, which comprises a vehicle control system 132 and an on-board diagnostic system 134, which is connected to the vehicle control system 132, wherein the asset beacon 110 is connected to the on-board diagnostic system, typically with an OBD connector that plugs into an OBD port of the vehicle, but in some cases via a wireless connection.

In another further related embodiment, the system for active asset control 100 can further include a vendor procurement system 142, wherein the asset controller 312 of the active asset control device 104 can be configured to allow a user to browse available services for the asset 130 and select selected services among the available services, in communication via the active asset control server 102, such that the active asset control server 102 receives and stores status information for the selected services, including completion status and cost incurred for each selected service. The available services can for example include at least one, or a combination of: windshield repair, windshield replacement, window chip repair, window replacement, side mirror replacement, tire replacement, gas service, wheel replacement, exhaust replacement, interior detailing, and exterior detailing.

In yet a further related embodiment, the system for active asset control 100 can further include an enterprise resource planning system 144, wherein the asset manager 210 of the active asset control server 102 is configured to communicate with the enterprise resource planning system 144 in order to create and process accounting records for the asset 130, wherein the accounting records further comprise the completion status and the cost incurred for each selected service.

In yet another further related embodiment, the system for active asset control 100 can further include a dealership management system 146, such that the active asset control server 102 can communicate with the dealership management system 146, to exchange data for vehicles 130.

Figure 5A:
FIG. 5A is an illustration of an active asset control graphical user interface, according to an embodiment of the invention.
Figure 5B:
FIG. 5B is an illustration of an active asset control graphical user interface, according to an embodiment of the invention.
Figure 5C:
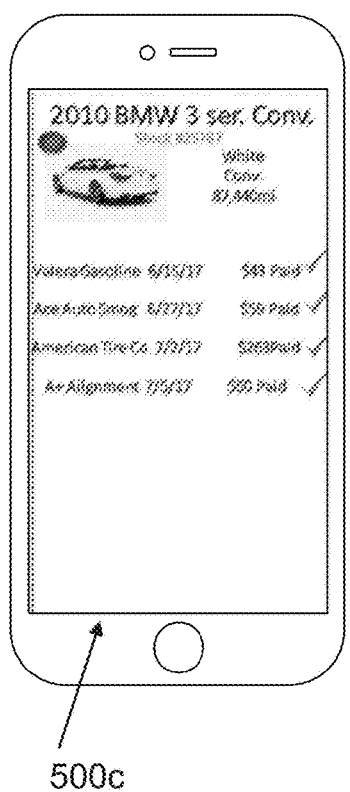
FIG. 5C is an illustration of an active asset control graphical user interface, according to an embodiment of the invention.
Figure 5D:
FIG. 5D is an illustration of an active asset control graphical user interface, according to an embodiment of the invention.
Figure 5E:
FIG. 5E is an illustration of an active asset control graphical user interface, according to an embodiment of the invention.
Figure 5F:
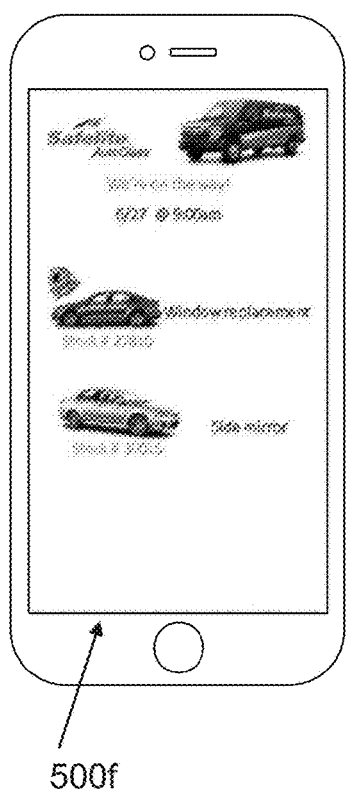
FIG. 5F is an illustration of an active asset control graphical user interface, according to an embodiment of the invention.
Figure 5G:
FIG. 5G is an illustration of an active asset control graphical user interface, according to an embodiment of the invention.
Figure 5H:
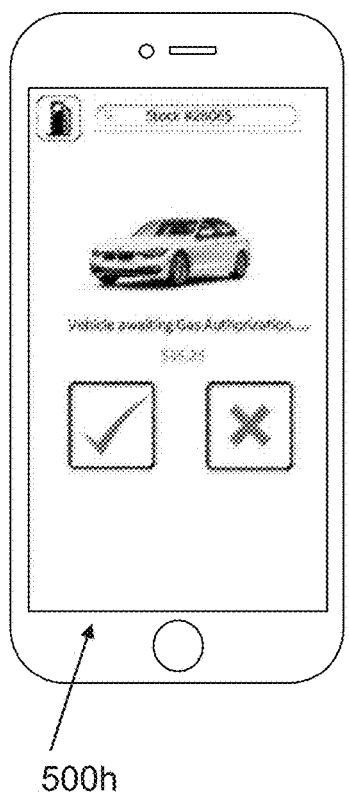
FIG. 5H is an illustration of an active asset control graphical user interface, according to an embodiment of the invention.
Figure 5I:
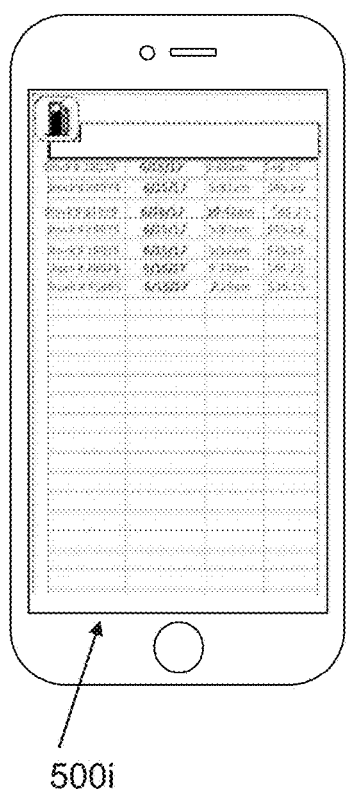
FIG. 5I is an illustration of an active asset control graphical user interface, according to an embodiment of the invention.
Figure 5J:
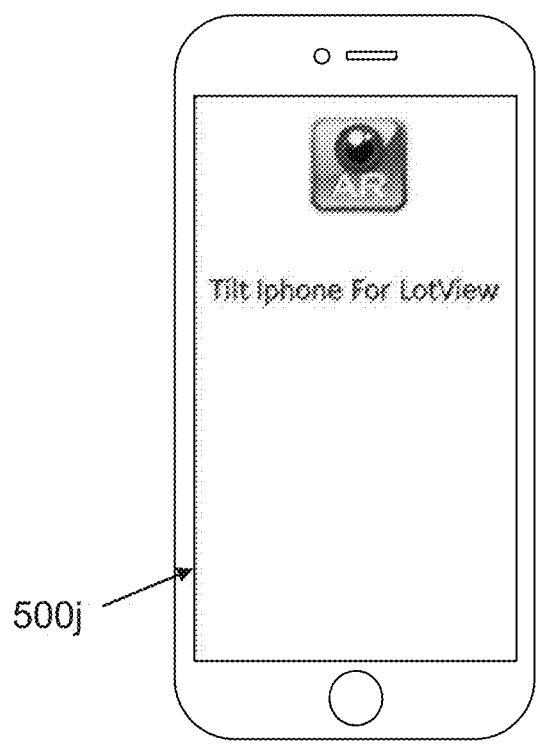
FIG. 5J is an illustration of an active asset control graphical user interface, according to an embodiment of the invention.
Figure 5K:
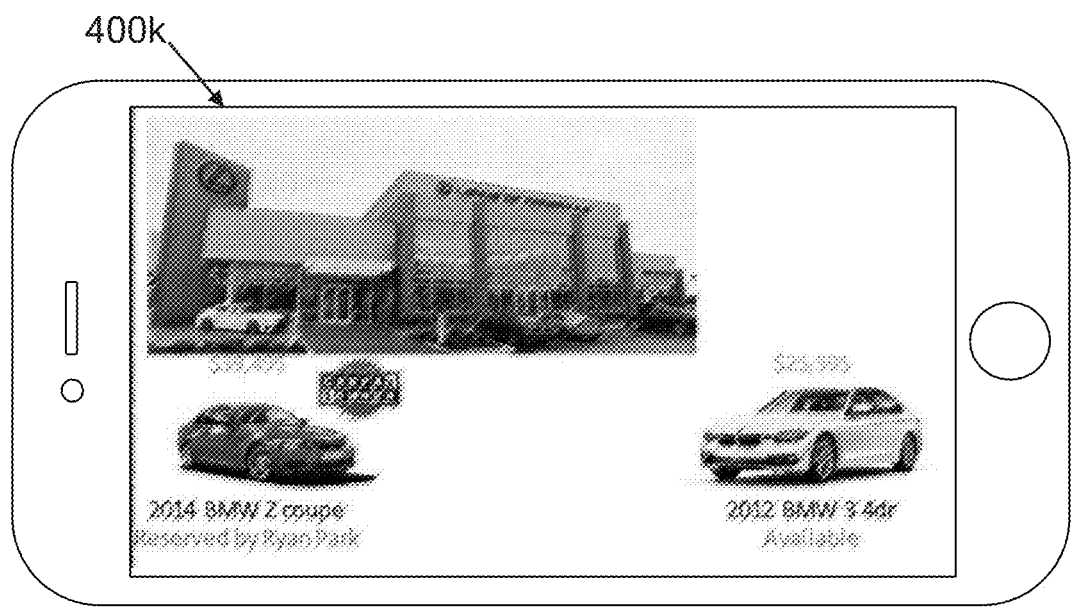
FIG. 5K is an illustration of an active asset control graphical user interface, according to an embodiment of the invention.

In yet another further related embodiment, as shown in FIG. 5K, the asset viewer 310 can be configured to incorporate asset property information onto an image stream from a camera 308 of the active asset control device 104, such that the asset viewer 310 uses the location of the active asset control device 104 captured by the location sensor 314, along with the direction vector of the active asset control device 104 captured by the orientation sensor 316, and locations of the assets 130 captured by location sensors 412 of asset beacons to calculate positions of assets 130 in the image stream, in order to incorporate values of attributes onto the image stream adjacent to the positions of the assets 130.

In related embodiments, the active asset control device 104 can include configurations as:
a) A web application, executing in a Web browser;
b) A tablet app, executing on a tablet device, such as for example an ANDROID™ or IOS™ tablet device;
c) A mobile app, executing on a mobile device, such as for example an ANDROID™ phone or IPHONE™, or any wearable mobile device;
d) A desktop application, executing on a personal computer, or similar device;
e) An embedded application, executing on a processing device, such as for example a smart TV, a game console or other system.

It shall be understood that an executing instance of an embodiment of the system for active asset control 100, as shown in FIG. 1, can include a plurality of active asset control devices 104, which are each tied to one or more users 122.

An executing instance of an embodiment of the system for active asset control 100, as shown in FIG. 1, can similarly include a plurality of active asset control servers 102.

In related example embodiments, FIGS. 5A-5K shows windows/screens associated with the graphical user interface (GUI) for the active asset control device 104, for embodiments of the system for active asset control 100, wherein the assets are vehicles 130 for sale at a vehicle dealership, and wherein the asset beacons 110 are OBD-II devices 110 that are plugged in to a OBD-II Port 134 of the vehicle 130, in order to communicate with the vehicle control system 132.

In a related example embodiment, FIG. 5A shows a home page window/screen 500a associated with the GUI for the active asset control device 104, including:
a) a vendor hub link, for viewing and selecting vendors to the dealership, in order to communicate provisioning of services via a vendor procurement system 142;
b) a search inventory link, for viewing and selecting vehicles 130 that are or will be offered for sale by the dealership;
c) an augmented reality/car view link, for augmented reality viewing of a vehicles 130 with attributes/information added;
d) an applied services link, for a view of service status for a vehicle 130, such as gas tank filled, exterior detailing, interior detailing, window chip fixed, small dent repaired, etc.;
e) a vendor link, for browsing vendors to the dealership;
f) an account transfer link, for viewing financial status of a specific item, such as a vehicle 130.

In a related example embodiment, FIG. 5B shows a vehicle overview window/screen 500b associated with the GUI for the active asset control device 104, showing an overview of vehicles 130 with associated attributes/meta data for the vehicles, including a picture, color, type of vehicle, and mileage of vehicle.

In a related example embodiment, FIG. 5C shows a vehicle detail window/screen 500c associated with the GUI for the active asset control device 104, showing meta information details for a vehicle 130 with associated attributes/meta data for the vehicles, including a picture, color, type of vehicle, and mileage of vehicle, and a log of services/repairs performed on the vehicle including service description, date, and cost of service for each service item.

In a related example embodiment, FIG. 5D shows a vendor hub window/screen 500d associated with the GUI for the active asset control device 104, with a search bar to search for available services from vendors, and provide a list of identified services including a cost for each identified service.

In a related example embodiment, FIG. 5E shows a vendor detail window/screen 500e associated with the GUI for the active asset control device 104, showing available services from a vendor, and a list of available services including a cost for each available service from the vendor.

In a related example embodiment, FIG. 5F shows a vendor planned service overview window/screen 500f associated with the GUI for the active asset control device 104, showing scheduled services from a vendor, and a list of scheduled services including a vehicle 130 identifier and a scheduled service for each scheduled service from the vendor.

In a related example embodiment, FIG. 5G shows an inventory overview window/screen 500g associated with the GUI for the active asset control device 104, showing vehicles 130 for sale and a list of applied services for each vehicle 130.

In a related example embodiment, FIG. 5H shows a gas authorization request window/screen 500h associated with the GUI for the active asset control device 104, showing a request for gas authorization for a vehicle 130.

In a related example embodiment, FIG. 5I shows a gas authorization overview window/screen 500i associated with the GUI for the active asset control device 104, showing an overview of gas services provided vehicles 130.

In a related example embodiment, FIG. 5J shows an augmented reality start window/screen 500j associated with the GUI for the active asset control device 104, showing an icon to start viewing in augmented reality view.

In a related example embodiment, FIG. 5K shows an augmented reality view window/screen 500k associated with the GUI for the active asset control device 104, showing a view of a dealership lot with vehicles 130 for sale, such that the augmented reality view window/screen 500k is augmented with meta information for each vehicle 130.

In an embodiment, as illustrated in FIG. 6, a method for active asset control 600, can include:

a) Positioning an asset beacon 602, wherein the asset beacon 110 is positioned in an asset 130, such as a vehicle, such that the asset beacon can communicate with the asset 130 to receive attributes describing/denoting properties of the asset 130;

b) Retrieving an attribute 604, wherein the attribute is received by an active asset control device 104, in communication with the asset beacon 110;

c) Selecting a service 606, wherein a user 122 browses available services for the asset 130 and selects selected services among the available services, in communication via an active asset control server 102, such that the active asset control server 102 receives and stores status information for the selected services, including completion status and cost incurred for each selected service;

d) Updating service cost 608, wherein the completion status is set to completed and the cost incurred is updated with an actual cost added (i.e. to add an actual cost for a selected services), when a selected service in the selected services is completed; and e) Viewing asset status 610, wherein the user 122 views asset information for the asset 130 via use of the active asset control device 104, wherein the asset information can include some or all of the at least one attribute, and the completion status and the cost incurred for each selected service, for example such that:

i. The active asset control device 104 incorporates asset information onto an image stream from a camera 308 of the active asset control device 104, such that the asset viewer 310 uses the location of the active asset control device 104 captured by the location sensor 314, along with the direction vector of the active asset control device 104 captured by the orientation sensor 316, and locations of the assets 130 captured by location sensors 412 of asset beacons to calculate positions of assets 130 in the image stream, in order to incorporate the asset information onto the image stream adjacent to the positions of the assets 130.

FIGS. 1, 2, 3 and 4 are block diagrams and flowcharts, methods, devices, systems, apparatuses, and computer program products according to various embodiments of the present invention. It shall be understood that each block or step of the block diagram, flowchart and control flow illustrations, and combinations of blocks in the block diagram, flowchart and control flow illustrations, can be implemented by computer program instructions or other means. Although computer program instructions are discussed, an apparatus or system according to the present invention can include other means, such as hardware or some combination of hardware and software, including one or more processors or controllers, for performing the disclosed functions.

Figure 2:
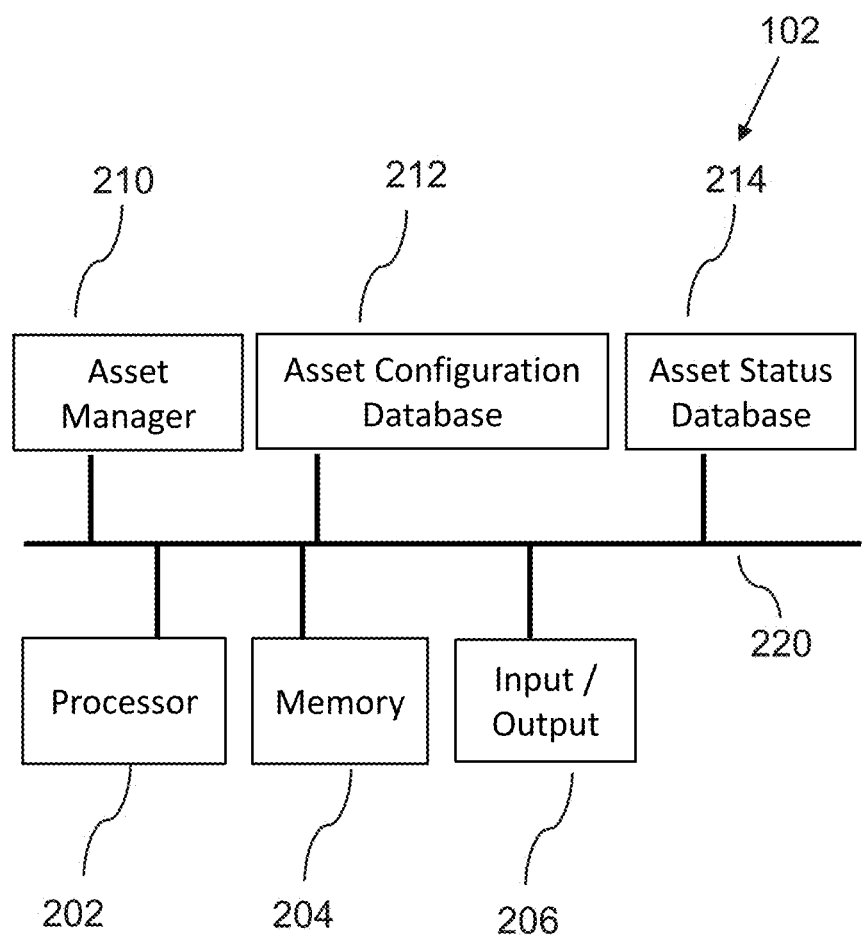
FIG. 2 is a schematic diagram illustrating an active asset control server, according to an embodiment of the invention.
Figure 3:
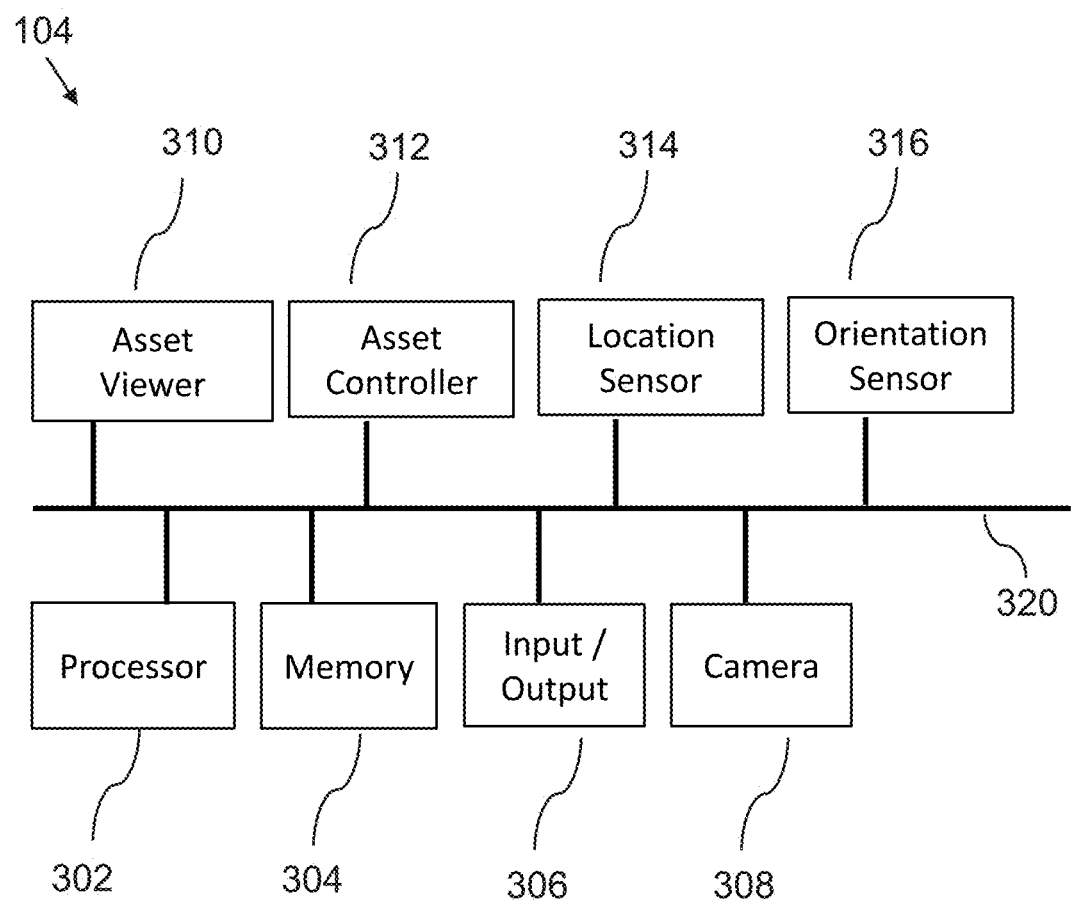
FIG. 3 is a schematic diagram illustrating an active asset control device, according to an embodiment of the invention.
Figure 4:
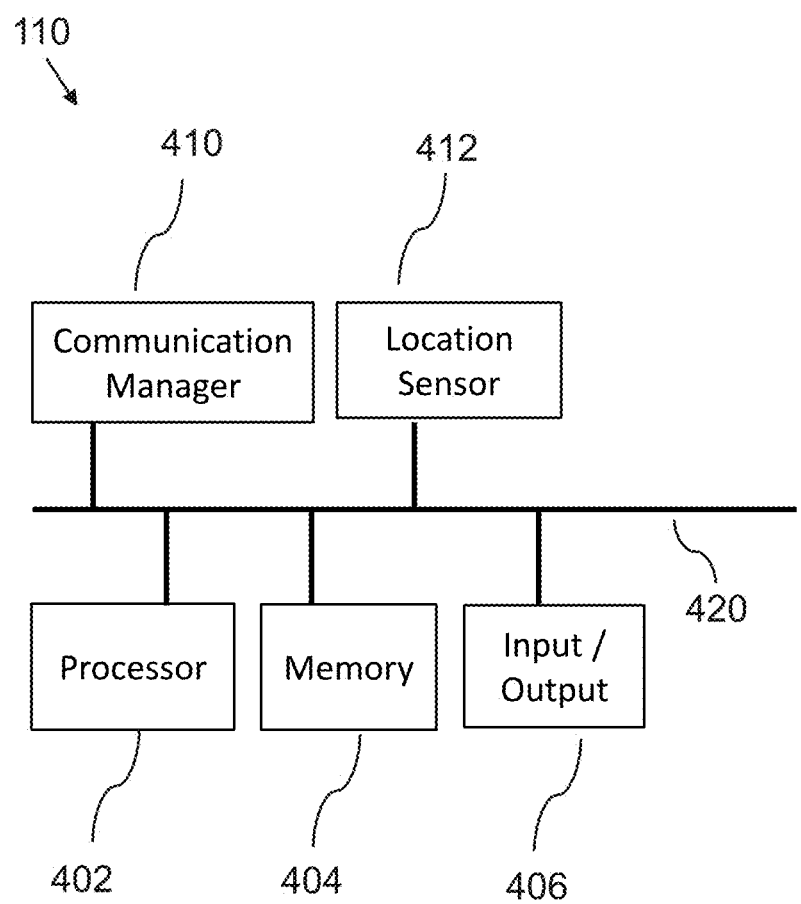
FIG. 4 is a schematic diagram illustrating an asset beacon, according to an embodiment of the invention.

In this regard, FIGS. 1, 2, and 3 depict the computer devices of various embodiments, each containing several of the key components of a general-purpose computer by which an embodiment of the present invention may be implemented. Those of ordinary skill in the art will appreciate that a computer can include many components. However, it is not necessary that all of these generally conventional components be shown in order to disclose an illustrative embodiment for practicing the invention. The general-purpose computer can include a processing unit and a system memory, which may include various forms of non-transitory storage media such as random access memory (RAM) and read-only memory (ROM). The computer also may include nonvolatile storage memory, such as a hard disk drive, where additional data can be stored.

FIG. 1 shows a depiction of an embodiment of the system for active asset control 100, including the active asset control server 102, and the active asset control device 104. In this relation, a server shall be understood to represent a general computing capability that can be physically manifested as one, two, or a plurality of individual physical computing devices, located at one or several physical locations. A server can for example be manifested as a shared computational use of one single desktop computer, a dedicated server, a cluster of rack-mounted physical servers, a datacenter, or network of datacenters, each such datacenter containing a plurality of physical servers, or a computing cloud, such as Amazon EC2 or Microsoft Azure.

It shall be understood that the above-mentioned components of the active asset control server 102 and the active asset control device 104 are to be interpreted in the most general manner.

For example, the processors 202 302 402 can each respectively include a single physical microprocessor or microcontroller, a cluster of processors, a datacenter or a cluster of datacenters, a computing cloud service, and the like.

In a further example, the non-transitory memories 204 304 404 can each respectively include various forms of non-transitory storage media, including random access memory and other forms of dynamic storage, and hard disks, hard disk clusters, cloud storage services, and other forms of long-term storage. Similarly, the input/outputs 206 306 406 can each respectively include a plurality of well-known input/output devices, such as screens, keyboards, pointing devices, motion trackers, communication ports, and so forth.

Furthermore, it shall be understood that the active asset control server 102 and the active asset control device 104 can each respectively include several other components that are well known in the art of general computer devices, and therefore shall not be further described herein. This can include system access to common functions and hardware, such as for example via operating system layers such as Windows, Linux, and similar operating system software, but can also include configurations wherein application services are executing directly on server hardware or via a hardware abstraction layer other than a complete operating system.

An embodiment of the present invention can also include one or more input or output components, such as a mouse, keyboard, monitor, and the like. A display can be provided for viewing text and graphical data, as well as a user interface to allow a user to request specific operations. Furthermore, an embodiment of the present invention may be connected to one or more remote computers via a network interface. The connection may be over a local area network (LAN) wide area network (WAN), and can include all of the necessary circuitry for such a connection.

In a related embodiment, the active asset control device 104 communicates with the active asset control server 102 over a network 106, which can include the general Internet, a Wide Area Network or a Local Area Network, or another form of communication network, transmitted on wired or wireless connections. Wireless networks can for example include Ethernet, Wi-Fi, Bluetooth, ZigBee, and NFC. The communication can be transferred via a secure, encrypted communication protocol.

Typically, computer program instructions may be loaded onto the computer or other general-purpose programmable machine to produce a specialized machine, such that the instructions that execute on the computer or other programmable machine create means for implementing the functions specified in the block diagrams, schematic diagrams or flowcharts. Such computer program instructions may also be stored in a computer-readable medium that when loaded into a computer or other programmable machine can direct the machine to function in a particular manner, such that the instructions stored in the computer-readable medium produce an article of manufacture including instruction means that implement the function specified in the block diagrams, schematic diagrams or flowcharts.

In addition, the computer program instructions may be loaded into a computer or other programmable machine to cause a series of operational steps to be performed by the computer or other programmable machine to produce a computer-implemented process, such that the instructions that execute on the computer or other programmable machine provide steps for implementing the functions specified in the block diagram, schematic diagram, flowchart block or step.

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagrams, schematic diagrams or flowcharts, as well as combinations of blocks or steps, can be implemented by special purpose hardware-based computer systems, or combinations of special purpose hardware and computer instructions, that perform the specified functions or steps.

As an example, provided for purposes of illustration only, a data input software tool of a search engine application can be a representative means for receiving a query including one or more search terms. Similar software tools of applications, or implementations of embodiments of the present invention, can be means for performing the specified functions. For example, an embodiment of the present invention may include computer software for interfacing a processing element with a user-controlled input device, such as a mouse, keyboard, touch screen display, scanner, or the like. Similarly, an output of an embodiment of the present invention may include, for example, a combination of display software, video card hardware, and display hardware. A processing element may include, for example, a controller or microprocessor, such as a central processing unit (CPU), arithmetic logic unit (ALU), or control unit.

Here has thus been described a multitude of embodiments of the system for active asset control 100 and methods related thereto, which can be employed in numerous modes of usage.

The many features and advantages of the invention are apparent from the detailed specification, and thus, it is intended by the appended claims to cover all such features and advantages of the invention, which fall within the true spirit and scope of the invention.

For example, alternative embodiments can reconfigure or combine the components of the active asset control server 102 and the active asset control device 104. The components of the active asset control server 102 can be distributed over a plurality of physical, logical, or virtual servers. Parts or all of the components of the active asset control device 104 can be configured to operate in the active asset control server 102, whereby the active asset control device 104 for example can function as a thin client, performing only graphical user interface presentation and input/output functions. Alternatively, parts or all of the components of the active asset control server 102 can be configured to operate in the active asset control device 104.

Many such alternative configurations are readily apparent, and should be considered fully included in this specification and the claims appended hereto. Accordingly, since numerous modifications and variations will readily occur to those skilled in the art, it is not desired to limit the invention to the exact construction and operation illustrated and described, and thus, all suitable modifications and equivalents may be resorted to, falling within the scope of the invention.

What is claimed is:

1. A system for active asset control, comprising:
a) at least one asset;
b) at least one asset beacon, which is positioned in the at least one asset;
c) an active asset control device, which is connected to the at least one asset beacon, wherein the active asset control device further comprises:
a camera;
a first location sensor, which is configured to calculate a first location of the active asset control device; and
an orientation sensor, which is configured to calculate a direction vector of the active asset control device;
d) an active asset control server; and
e) a vendor procurement system;
wherein the at least one asset beacon is configured to communicate with the at least one asset in order to receive at least one attribute describing a property of the at least one asset;
wherein the active asset control device is configured to communicate with the at least one asset beacon in order to receive the at least one attribute;
such that the active asset control device is connected to the active asset control server, such that the asset control device communicates with the active asset control server in order to store the at least one attribute on the active asset control server;
wherein the asset controller of the active asset control device is configured to allow a user to browse available services for the at least one asset and select selected services among the available services, in communication via the active asset control server, such that the active asset control server receives and stores status information for the selected services, including completion status and cost incurred for each selected service;
  wherein the at least one asset beacon further comprises:
    a second location sensor, which is configured to calculate a second location of the at least one asset beacon;
    wherein the asset viewer is configured to incorporate asset information onto an image stream from the camera of the active asset control device, such that the asset viewer uses the first location and the direction vector of the active asset control device, and the second location of the at least one asset captured by the location sensor of the at least one asset beacon to calculate a position of the at least one asset in the image stream, in order to incorporate the asset information onto the image stream adjacent to the position of the at least one asset;
    wherein the asset information is selected from the group consisting of the at least one attribute, the completion status and the cost incurred for each selected service, and combinations thereof.

2. The system for active asset control of claim 1, wherein the at least one asset beacon is further configured to control functions of the at least one asset, and wherein the active asset control device is further configured to communicate commands to control the functions of the at least one asset.

3. The system for active asset control of claim 1, wherein the active asset control server comprises:
  a) a processor;
  b) a non-transitory memory;
  c) an input/output component;
  d) an asset configuration database, which is configured to store a plurality of asset class configurations, each including available attributes and available commands for an asset class of the at least one asset; and
  e) an asset status database, which is configured to store the at least one attribute received from the at least one asset; all connected via
  f) a data bus.

4. The system for active asset control of claim 2, wherein the active asset control device comprises:
  a) a processor;
  b) a non-transitory memory;
  c) an input/output;
  d) an asset viewer, which is configured to allow a user to view the at least one attribute, and select the commands to be sent to the at least one asset; and
  e) an asset controller, which can communicate with the at least one asset beacon in order to receive the at least one attribute and to communicate the commands to control the functions of the at least one asset; all connected via
  f) a data bus.

5. The system for active asset control of claim 2, wherein the at least one asset is a vehicle, which comprises a vehicle control system and an on-board diagnostic system, which is connected to the vehicle control system, wherein the at least one asset beacon is connected to the on-board diagnostic system.

6. The system for active asset control of claim 1, further comprising: an enterprise resource planning system; wherein the asset manager of the active asset control server is configured to communicate with the enterprise resource planning system in order to create and process accounting records for the at least one asset, wherein the accounting records further comprise the completion status and the cost incurred for each selected service.

7. The system for active asset control of claim 1, wherein the asset information includes the at least one attribute, the completion status and the cost incurred for each selected service.

8. The system for active asset control of claim 5, wherein the commands are selected from the group consisting of unlock doors, lock doors, start engine, get rpm, get active fault codes, get historical fault codes, and combinations thereof.

9. The system for active asset control of claim 5, wherein the at least one attribute is selected from the group consisting of gas tank level, battery load percentage, fault code status, and combinations thereof.

10. The system for active asset control of claim 1, wherein the available services are selected from the group consisting of windshield repair, windshield replacement, window chip repair, window replacement, side mirror replacement, tire replacement, gas service, wheel replacement, exhaust replacement, interior detailing, exterior detailing, and combinations thereof.

11. A method for active asset control, comprising:
  a) positioning an asset beacon, wherein the asset beacon is positioned in an asset, such that the asset beacon communicates with the asset to receive at least one attribute that denotes a property of the asset;
  b) retrieving the at least one attribute, wherein the at least one attribute is received by an active asset control device, in communication with the asset beacon, wherein the active asset control device further comprises:
    a processor;
    a non-transitory memory;
    an input/output;
    an asset viewer, which is configured to allow a user to view the at least one attribute, and select commands to be sent to the asset;
    a camera;
    a first location sensor, which is configured to calculate a location of the active asset control device; and
    an orientation sensor, which is configured to calculate a direction vector of the active asset control device; all connected via
    a data bus; and
  c) selecting a service, wherein a user browses available services for the asset and selects at least one selected service among the available services, in communication via an active asset control server, such that the active asset control server receives and stores status information for the selected services, including a completion status and a cost incurred for each selected service;
  wherein the asset beacon further comprises:
    a second location sensor, which is configured to calculate a location of the asset beacon;
    wherein the asset viewer is configured to incorporate asset information onto an image stream from the camera of the active asset control device, such that the asset viewer uses the location and the direction vector of the active asset control device, and the location of the asset captured by the second location sensor of the asset beacon to calculate a position of the at least one asset in the image stream, in order to incorporate the asset information onto the image stream adjacent to the position of the asset;

wherein the asset information is selected from the group consisting of the at least one attribute, the completion status and the cost incurred for each selected service, and combinations thereof.

12. The method for active asset control of claim 11, further comprising updating service cost, wherein the completion status is set to completed and the cost incurred is updated too add an actual cost for a selected service, when the selected service in the selected services is completed.

13. The method for active asset control of claim 11, further comprising viewing asset status, wherein the user views asset information for the asset via use of the active asset control device, wherein the asset information comprises the at least one attribute and the completion status and the cost incurred for each selected service.

14. The method for active asset control of claim 11, wherein the asset is a vehicle, which comprises a vehicle control system and an on-board diagnostic system, which is connected to the vehicle control system, wherein the asset beacon is connected to the on-board diagnostic system.

15. The method for active asset control of claim 11, wherein the active asset control server comprises:
a) a processor;
b) a non-transitory memory;
c) an input/output component;
d) an asset configuration database, which is configured to store a plurality of asset class configurations, each including available attributes and available commands for an asset class of the at least one asset; and
e) an asset status database, which is configured to store the at least one attribute received from the asset; all connected via
f) a data bus.

16. A system for active asset control, comprising:
a) at least one asset;
b) at least one asset beacon, which is positioned in the at least one asset;
c) an active asset control device, which is connected to the at least one asset beacon;
d) an active asset control server;
e) a vendor procurement system; and
f) an enterprise resource planning system;
wherein the at least one asset beacon is configured to communicate with the at least one asset in order to receive at least one attribute describing a property of the at least one asset;
wherein the active asset control device is configured to communicate with the at least one asset beacon in order to receive the at least one attribute;

such that the active asset control device is connected to the active asset control server, such that the asset control device communicates with the active asset control server in order to store the at least one attribute on the active asset control server;

wherein the asset controller of the active asset control device is configured to allow a user to browse available services for the at least one asset and select selected services among the available services, in communication via the active asset control server, such that the active asset control server receives and stores status information for the selected services, including completion status and cost incurred for each selected service; and wherein the asset manager of the active asset control server is configured to communicate with the enterprise resource planning system in order to create and process accounting records for the at least one asset, wherein the accounting records further comprise the completion status and the cost incurred for each selected service.

17. The system for active asset control of claim 16, wherein the active asset control device further comprises:
a) a camera;
b) a first location sensor, which is configured to calculate a first location of the active asset control device; and
c) an orientation sensor, which is configured to calculate a direction vector of the active asset control device.

18. The system for active asset control of claim 17, wherein the at least one asset beacon further comprises:
a second location sensor, which is configured to calculate a second location of the at least one asset beacon;
wherein the asset viewer is configured to incorporate asset information onto an image stream from the camera of the active asset control device, such that the asset viewer uses the first location and the direction vector of the active asset control device, and the second location of the at least one asset captured by the location sensor of the at least one asset beacon to calculate a position of the at least one asset in the image stream, in order to incorporate the asset information onto the image stream adjacent to the position of the at least one asset;
wherein the asset information is selected from the group consisting of the at least one attribute, the completion status and the cost incurred for each selected service, and combinations thereof.

19. The system for active asset control of claim 18, wherein the asset information includes the at least one attribute, the completion status and the cost incurred for each selected service.

* * * * *